(12) United States Patent
Yuan et al.

(10) Patent No.: US 10,959,278 B2
(45) Date of Patent: Mar. 23, 2021

(54) CALL SETUP METHOD AND APPARATUS

(71) Applicant: Huawei Technologies Co., Ltd., Shenzhen (CN)

(72) Inventors: Kai Yuan, Beijing (CN); Fenghui Dou, Beijinig (CN); Ming Ding, Beijing (CN); Hui Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/487,253

(22) PCT Filed: Jun. 15, 2017

(86) PCT No.: PCT/CN2017/088520
§ 371 (c)(1),
(2) Date: Aug. 20, 2019

(87) PCT Pub. No.: WO2018/152988
PCT Pub. Date: Aug. 30, 2018

(65) Prior Publication Data
US 2019/0373664 A1 Dec. 5, 2019

(30) Foreign Application Priority Data

Feb. 22, 2017 (CN) .......................... 201710096800.1
May 5, 2017 (WO) ................ PCT/CN2017/083291

(51) Int. Cl.
*H04W 76/18* (2018.01)
*H04W 76/25* (2018.01)
(Continued)

(52) U.S. Cl.
CPC ............. *H04W 76/18* (2018.02); *H04W 4/12* (2013.01); *H04W 76/25* (2018.02); *H04W 76/30* (2018.02)

(58) Field of Classification Search
CPC ...... H04W 76/18; H04W 76/25; H04W 76/30; H04W 4/12
(Continued)

(56) References Cited

U.S. PATENT DOCUMENTS 5,381,415 A    1/1995  Mizutani
5,655,019 A *  8/1997  McKernan ............... H04K 3/28
                                                          455/1
(Continued)

FOREIGN PATENT DOCUMENTS

CN    101155389 A    4/2008
CN    102893691 A    1/2013
(Continued)

OTHER PUBLICATIONS

Machine Translation and Abstract of Chinese Publication No. CN101155389, Apr. 2, 2008, 13 pages.
(Continued)

*Primary Examiner* — Christopher R Crompton
(74) *Attorney, Agent, or Firm* — Conley Rose, P.C.

(57) ABSTRACT

A call setup method and associated apparatus discloses sending a first message to a network device, wherein the first message is used by the electronic device to request to set up an outgoing call; receiving a second message sent by the network device, wherein the second message is used by the electronic device to set up an incoming call; caching the second message when the electronic device is in a call initiation state; releasing the outgoing call based on an indication message received from the network device and setting up the incoming call.

20 Claims, 5 Drawing Sheets

(51) Int. Cl.
*H04W 76/30* (2018.01)
*H04W 4/12* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 5,870,672 | A * | 2/1999 | Stoddard | H04W 12/1206 455/410 |
| 6,172,977 | B1 * | 1/2001 | Christie | H04J 3/125 370/395.61 |
| 6,826,718 | B1 * | 11/2004 | Wu | H04W 24/08 379/1.01 |
| 7,248,565 | B1 * | 7/2007 | Fourie | H04M 7/1255 370/235 |
| 7,684,364 | B2 * | 3/2010 | McClung | H04L 12/6418 370/329 |
| 8,233,607 | B1 * | 7/2012 | Ambrose | H04M 3/42212 379/215.01 |
| 8,755,502 | B1 * | 6/2014 | Schlesener | H04M 3/42 379/201.01 |
| 8,958,543 | B1 * | 2/2015 | Elkin | H04M 3/5158 379/266.07 |
| 2001/0043580 | A1 * | 11/2001 | Krishnamurthi | H04W 76/19 370/335 |
| 2002/0057653 | A1 * | 5/2002 | Dolan | H04W 88/181 370/252 |
| 2003/0064726 | A1 | 4/2003 | Bae | |
| 2007/0004421 | A1 * | 1/2007 | Chambers | H04W 72/10 455/450 |
| 2009/0310534 | A1 * | 12/2009 | Lindskog | H04L 1/1877 370/328 |
| 2011/0194678 | A1 | 8/2011 | Lewis et al. | |
| 2011/0264746 | A1 * | 10/2011 | Yin | H04L 69/28 709/206 |
| 2012/0021751 | A1 | 1/2012 | Zhang et al. | |
| 2014/0066118 | A1 * | 3/2014 | Pai | H04W 76/45 455/518 |
| 2014/0280885 | A1 * | 9/2014 | Ayandeh | H04L 43/0894 709/224 |
| 2015/0358361 | A1 * | 12/2015 | Balasaygun | H04L 65/1006 709/228 |
| 2017/0353503 | A1 | 12/2017 | Trabelsi et al. | |

FOREIGN PATENT DOCUMENTS

| | | |
|---|---|---|
| CN | 105207973 A | 12/2015 |
| CN | 105338503 A | 2/2016 |
| CN | 105554811 A | 5/2016 |
| EP | 1298855 A2 | 4/2003 |
| EP | 2938054 A3 | 2/2016 |
| EP | 3255860 A1 | 12/2017 |
| JP | H04154331 A | 5/1992 |
| JP | H05211553 A | 8/1993 |
| JP | 2003134126 A | 5/2003 |
| JP | 2011254222 A | 12/2011 |
| JP | 2016519913 A | 7/2016 |

OTHER PUBLICATIONS

Machine Translation and Abstract of Chinese Publication No. CN102893691, Jan. 23, 2013, 33 pages.
Machine Translation and Abstract of Chinese Publication No. CN105207973, Dec. 30, 2015, 7 pages.
Machine Translation and Abstract of Chinese Publication No. CN105338503, Feb. 17, 2016, 18 pages.
Foreign Communication From A Counterpart Application, European Application No. 17898066.0, Extended European Search Report dated Nov. 19, 2019, 7 pages.
3GPP TS 24.008 V14.2.0, "3rd Generation Partnership Project;Technical Specification Group Core Network and Terminals; Mobile radio interface Layer 3 specification; Core network protocols; Stage 3 (Release 14)," Dec. 2016, 765 pages.

* cited by examiner ic field of
communications technologies, and in particular, to a call
setup method and an apparatus.

CALL SETUP METHOD AND APPARATUS

CROSS-REFERENCE TO RELATED APPLICATIONS

This application is a National Stage of International Application No. PCT/CN2017/088520, filed on Jun. 15, 2017, which claims priority to Chinese Patent Application No. 201710096800.1, filed on Feb. 22, 2017, and International Application No. PCT/CN2017/083291, filed on May 5, 2017. All of the aforementioned applications are hereby incorporated by reference in their entireties.

TECHNICAL FIELD

Embodiments of the present invention relate to the field of communications technologies, and in particular, to a call setup method and an apparatus.

BACKGROUND

As one of the most critical functions of a terminal, a call can be used to implement real-time communication between people, and is undoubtedly of great importance. However, if the terminal initiates an outgoing call, and receives an incoming call before the outgoing call is connected, neither the outgoing call nor the incoming call can be connected. Such a conflict between an outgoing call and an incoming call frequently occurs at present.

Generally, there are several methods for resolving the conflict between the outgoing call and the incoming call. One method for resolving the conflict between the outgoing call and the incoming call includes the following steps: After initiating an outgoing call request, a terminal receives incoming call signaling delivered by a network device. If determining that a status conflict occurs between the outgoing call request and the incoming call signaling, the terminal discards the incoming call signaling, retains an outgoing call connection, and sends a status conflict message to the network device. After receiving the status conflict message sent by the terminal, the network device retains an incoming call link, rejects the outgoing call request of the terminal, and sends a rejection message to the terminal. In this case, the network device does not release an incoming call connection. After receiving the rejection message sent by the network device, the terminal releases the outgoing call. The terminal re-initiates the outgoing call. Because the network device does not release the incoming call connection, the network device does not match the terminal in status. Therefore, the network device considers by default that the current state is a conflict state. Consequently, the network device rejects an outgoing call re-initiation request initiated by the terminal.

However, in this method, because the terminal discards the incoming call signaling, and the network device rejects the outgoing call re-initiation request initiated by the terminal, the terminal does not match the network device in status. Consequently, neither the outgoing call nor the incoming call is connected, thereby affecting user experience.

Another method for resolving the conflict between the outgoing call and the incoming call includes the following steps: After initiating an outgoing call request, a terminal receives incoming call signaling delivered by a network device. The terminal determines that a status conflict occurs between the outgoing call request and the incoming call signaling, and sends a conflict message to the network device, to instruct the network device to release an incoming call connection. A cause value carried in the conflict message is that a user is busy. After receiving the conflict message sent by the terminal, the network device rejects the outgoing call request of the terminal, and releases the outgoing call and the incoming call.

However, because this method is applied to a scenario in which the outgoing call conflicts with the incoming call, when the terminal sends the conflict message to the network device, the network device releases the incoming call and rejects the outgoing call based on the conflict message. Consequently, neither the outgoing call nor the incoming call is connected, thereby affecting user experience.

SUMMARY

Embodiments of the present invention provide a call setup method and an apparatus, to resolve a problem that neither an outgoing call nor an incoming call is connected if the outgoing call conflicts with the incoming call.

According to a first aspect, an embodiment of this application provides a call setup method. The method specifically includes: sending, by a terminal, a first message to a network device, where the first message is used by the terminal to request to set up an outgoing call; and entering, by the terminal, a call initiating state; receiving, by the terminal, a second message sent by the network device, where the second message is used by the terminal to set up an incoming call; sending, by the terminal, a third message to the network device, where the third message is used to indicate that the second message is incompatible with a protocol state of the terminal; and sending, by the terminal, a fourth message to the network device, where the fourth message is used by the terminal to confirm the incoming call.

In this solution, if an outgoing call conflicts with an incoming call, when the outgoing call has not been connected, the terminal determines that an outgoing call request message and an incoming call indication message are conflict messages. The terminal caches the incoming call indication message, and releases the outgoing call based on an indication message received from the network device, to set up an incoming call connection. This ensures that a user can preferentially know an incoming call request, avoiding missing any call, and resolves a problem that neither the outgoing call nor the incoming call is connected when the outgoing call conflicts with the incoming call. Therefore, in this solution, the user misses no call, improving user experience.

In an optional implementation, after the receiving, by the terminal, a second message sent by the network device, the method may include: determining, by the terminal, that the second message is incompatible with the call initiating state.

In another optional implementation, an initial state of an incoming call control status is a null state.

In still another optional implementation, after the receiving, by the terminal, a second message sent by the network device, the method may include: caching, by the terminal, the second message.

In yet another optional implementation, after the sending, by the terminal, a third message to the network device, the method may include: receiving, by the terminal, a fifth message sent by the network device, where the fifth message is used to reject the outgoing call setup; and releasing, by the terminal, the outgoing call based on the fifth message.

In yet another optional implementation, after the sending, by the terminal, a third message to the network device, the method may include: switching, by the terminal, a call control status from the call initiating state to a mobile network call control setup adaptability MNCC_SETUP_IND state.

According to a second aspect, an embodiment of this application provides a call setup method. The method specifically includes: receiving, by a network device, a first message sent by a terminal, where the first message is used to request to set up an outgoing call; sending, by the network device, a second message to the terminal, where the second message is used by the terminal to set up an incoming call; receiving, by the network device, a third message sent by the terminal, where the network device determines, based on the third message, that the second message is incompatible with a protocol state of the terminal; and receiving, by the network device, a fourth message sent by the terminal; and setting up, by the network device, an incoming call connection to the terminal.

In this solution, if the outgoing call conflicts with the incoming call, when the outgoing call has not been connected, the network device releases an outgoing call control status based on an indication message received from the terminal, enters an incoming call control status, and sets up the incoming call connection. This ensures that a user can preferentially know an incoming call request, avoiding missing any call, and resolves a problem that neither the outgoing call nor the incoming call is connected when the outgoing call conflicts with the incoming call. Therefore, in this solution, the user misses no call, improving user experience.

In an optional implementation, after the receiving, by the network device, a third message sent by the terminal, the method may further include: retaining, by the network device, the incoming call.

In another optional implementation, after the receiving, by the network device, a third message sent by the terminal, the method may further include: releasing, by the network device, the outgoing call.

In still another optional implementation, after the receiving, by the network device, a third message sent by the terminal, the method may further include: sending, by the network device, a fifth message to the terminal, where the fifth message is used to reject the first message.

According to a third aspect, an embodiment of this application provides a terminal. The terminal includes: a transmitter, configured to send a first message to a network device, where the first message is used by the terminal to request to set up an outgoing call; a processor, configured to control the terminal to enter a call initiating state; and a receiver, configured to receive a second message sent by the network device, where the second message is used by the terminal to set up an incoming call, where the transmitter is further configured to send a third message to the network device, where the third message is used to indicate that the second message is incompatible with a protocol state of the terminal; and the transmitter is further configured to send a fourth message to the network device, where the fourth message is used by the terminal to confirm the incoming call.

In an optional implementation, the processor is further configured to determine that the second message is incompatible with the call initiating state.

In another optional implementation, the processor is further configured to cache the second message.

In still another optional implementation, the receiver is further configured to receive a fifth message sent by the network device, where the fifth message is used to reject the outgoing call setup; and the processor is further configured to release the outgoing call based on the fifth message.

In yet another optional implementation, the processor is further configured to switch a call control status from the call initiating state to an MNCC_SETUP_IND state.

According to a fourth aspect, an embodiment of this application provides a network device. The device includes: a transmitter, configured to send a first message, where the first message is used to request to set up an outgoing call, and the transmitter is further configured to send a second message to a terminal, where the second message is used by the terminal to set up an incoming call;

a receiver, configured to receive a third message sent by the terminal, where the network device determines, based on the third message, that the second message is incompatible with a protocol state of the terminal, and the receiver is further configured to receive a fourth message sent by the terminal; and a processor, configured to set up an incoming call connection to the terminal.

In an optional implementation, the processor is further configured to retain the incoming call.

In another optional implementation, the processor is further configured to release the outgoing call.

In still another optional implementation, the transmitter is further configured to send a fifth message to the terminal, where the fifth message is used to reject the first message.

According to a fifth aspect, an embodiment of this application provides a call setup method. The method specifically includes: sending, by a terminal, a first message to a network device, where the first message is used by the terminal to request to set up an outgoing call; receiving, by the terminal, a second message sent by the network device, where the second message is used by the terminal to set up an incoming call; caching, by the terminal, the second message; receiving, by the terminal, a fifth message sent by the network device, where the fifth message is used to reject or accept the outgoing call setup; and releasing, by the terminal, the outgoing call based on the fifth message when the fifth message is used to reject the outgoing call setup; or resuming, by the terminal, the outgoing call setup based on the fifth message when the fifth message is used to accept the outgoing call setup.

In this solution, if an outgoing call conflicts with an incoming call, when the outgoing call has not been connected, the terminal determines that an outgoing call request message and an incoming call indication message are conflict messages. The terminal does not process it as a protocol anomaly. The terminal caches the incoming call indication message, and releases the outgoing call based on an indication message received from the network device, to set up an incoming call connection; or sets up an outgoing call connection based on an indication message received from the network device. This resolves a problem that neither the outgoing call nor the incoming call is connected when the outgoing call conflicts with the incoming call.

In an optional implementation, after the terminal caches the second message, the terminal starts a timer; and the terminal discards the second message when the timer expires; or the terminal waits for an indication message delivered by the network device, when the timer does not expire.

In an optional implementation, the terminal simultaneously caches the second message and starts a timer; and the terminal discards the second message when the timer expires; or the terminal waits for an indication message delivered by the network device, when the timer does not expire.

In an optional implementation, after the terminal releases the outgoing call based on the fifth message, the terminal sends a fourth message to the network device, where the fourth message is used by the terminal to confirm the incoming call.

In another optional implementation, before the terminal sends the fourth message to the network device, the terminal reads the cached second message. The terminal sends the fourth message to the network device only after the terminal reads the second message and processes the second message, where the fourth message is used for confirming the incoming call.

In another optional implementation, after the terminal receives the second message sent by the network device, the terminal does not process it as a protocol anomaly (incompatibility), but caches the second message, and waits for a message sent by the network device for releasing or rejecting the outgoing call.

In still another optional implementation, when the fifth message is used to accept the outgoing call setup, the terminal discards the cached second message.

According to a sixth aspect, an embodiment of this application provides a terminal. The terminal includes: a transmitter, configured to send a first message to a network device, where the first message is used by the terminal to request to set up an outgoing call; a processor, configured to control the terminal to enter a call initiating state; and a receiver, configured to receive a second message sent by the network device, where the second message is used by the terminal to set up an incoming call; where the processor is further configured to cache the second message; the receiver is further configured to receive a fifth message sent by the network device, where the fifth message is used to reject or accept the outgoing call setup; and the processor is further configured to: release the outgoing call based on the fifth message when the fifth message is used to reject the outgoing call setup; or resume the outgoing call based on the fifth message when the fifth message is used to accept the outgoing call setup.

In an optional implementation, the processor is further configured to start a timer; and the processor discards the second message when the timer expires.

In an optional implementation, the transmitter is further configured to send a fourth message to the network device, where the fourth message is used by the terminal to confirm the incoming call.

In an optional implementation, the processor is further configured to read the cached second message.

In an optional implementation, the processor is further configured to determine that the second message is incompatible with the call initiating state.

In an optional implementation, the processor is further configured to discard the cached second message when the fifth message is used to accept the outgoing call setup.

According to a seventh aspect, an embodiment of this application provides a computer readable storage medium, where the computer readable storage medium stores an instruction. When the instruction runs on a computer, the computer is caused to perform the method in the foregoing aspects.

According to an eighth aspect, an embodiment of this application provides a computer program product including an instruction. When the instruction runs on a computer, the computer is caused to perform the method in the foregoing aspects.

DESCRIPTION OF EMBODIMENTS

To facilitate understanding of the embodiments of the present invention, the following further explains the specific embodiments with reference to the accompanying drawings, and the embodiments do not constitute a limitation on the embodiments of the present invention.

In this solution, if an outgoing call conflicts with an incoming call, when the outgoing call is not connected, a terminal determines that an outgoing call request message and an incoming call indication message are conflict messages. The terminal caches the incoming call indication message, and releases the outgoing call based on an indication message received from a network device, to set up an incoming call connection. This ensures that a user can preferentially know an incoming call request, avoiding missing any call, and resolves a problem that neither the outgoing call nor the incoming call is connected when the outgoing call conflicts with the incoming call. Therefore, in this solution, the user misses no call, improving user experience.

Figure 1:
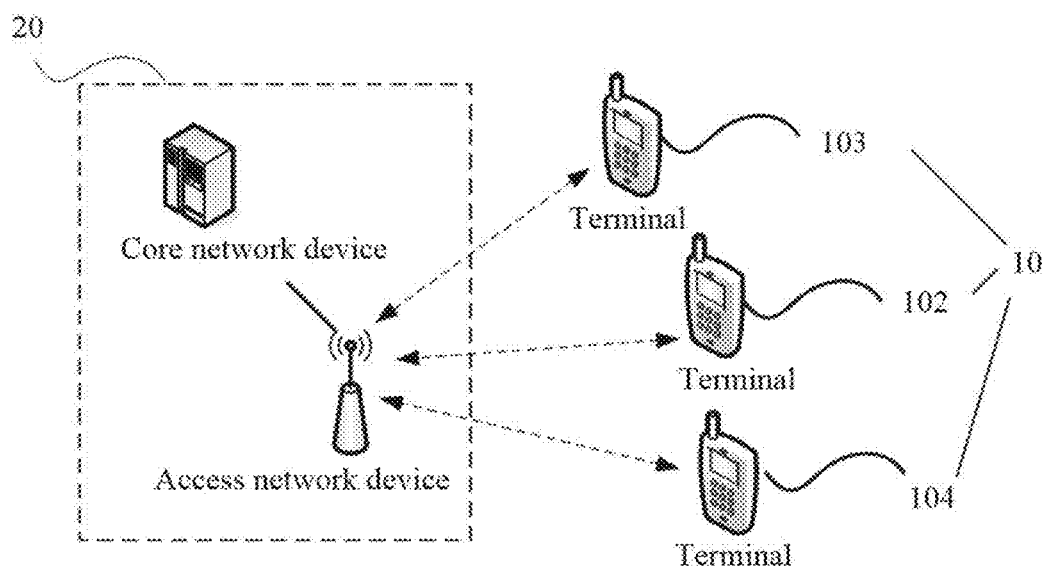
FIG. 1 is a schematic diagram of a call setup system according to an embodiment of the present invention.

FIG. 1 is a schematic diagram of a call setup system according to an embodiment of the present invention. FIG. 1 shows a schematic diagram of a partial structure of a system architecture related to an embodiment of the present invention. As shown in FIG. 1, the system architecture may specifically include a network device 20 and a terminal 10. The network device may be a mobile switching center (mobile switching center, MSC). The network device may include an access network device and a core network device. There may be a plurality of terminals 10. For example, as shown in FIG. 1, the terminal 10 may include a terminal 102, a terminal 103, a terminal 104, and the like. The plurality of terminals 10 may be connected to the core network device for communication by using the access network device. Further, the plurality of terminals 10 may access a backbone network by using a core network, and perform communication by using the backbone network.

The core network device may be a device that provides a user connection, manages a user, and completes service bearing and is used as an interface provided by a bearer network for an external network. A basic service that can be provided by the core network includes mobile office, e-commerce, communication, an entertainment service, a travel, and a location-based service, a telemetry (Telemetry) service, a simple message transfer service (monitoring and control), or the like. A Long Term Evolution (Long Term Evolution, LTE) communications system is used as an example. The core network device may be a mobility management entity (mobility management entity, MME), a serving gateway (serving gateway, SGW), a packet data network gateway (packet data network gateway, P-GW), or the like.

The access network device may be an apparatus deployed in a radio access network for providing a wireless communication function for the terminal 10. The apparatus may include a macro base station, a micro base station, a relay node, an access point, and the like in various forms. In systems that use different radio access technologies, names of devices that have a base station function may be different. For example, in an LTE network, a device having the base station function is referred to as an evolved NodeB (evolved NodeB, eNB or eNodeB for short), and in a 3rd Generation 3G network, the device is referred to as a NodeB (NodeB), or the like. For ease of description, in this application, for example, the access network device and the core network device are apparatuses that provide a wireless communication function for a terminal, provide a terminal connection, terminal management, and complete service bearing, and act as interface devices provided by the bearer network for the external network. The devices are collectively referred to as a network device for description. The network device may be configured to receive a call request and set up a call connection.

For ease of description, in this application, an example in which the core network device and the access network device are collectively referred to as a network device is used for description. The network device may be configured to receive a call request and set up a call connection.

The terminal 10 may include various handheld devices, in-vehicle devices, wearable devices, computing devices that have a wireless communication function, or other processing devices connected to a wireless modem, and various forms of user equipments (User Equipment, UE), mobile stations (Mobile station, MS), terminals (terminal), terminal equipment (Terminal Equipment), and the like.

An interaction process between the terminal 10 and the network device 20 in a specific implementation process of the embodiments of this application is further described below with reference to the accompanying drawings. An example in which a mobile switching center acts as the network device 20 is used for detailed description.

Figure 2A:
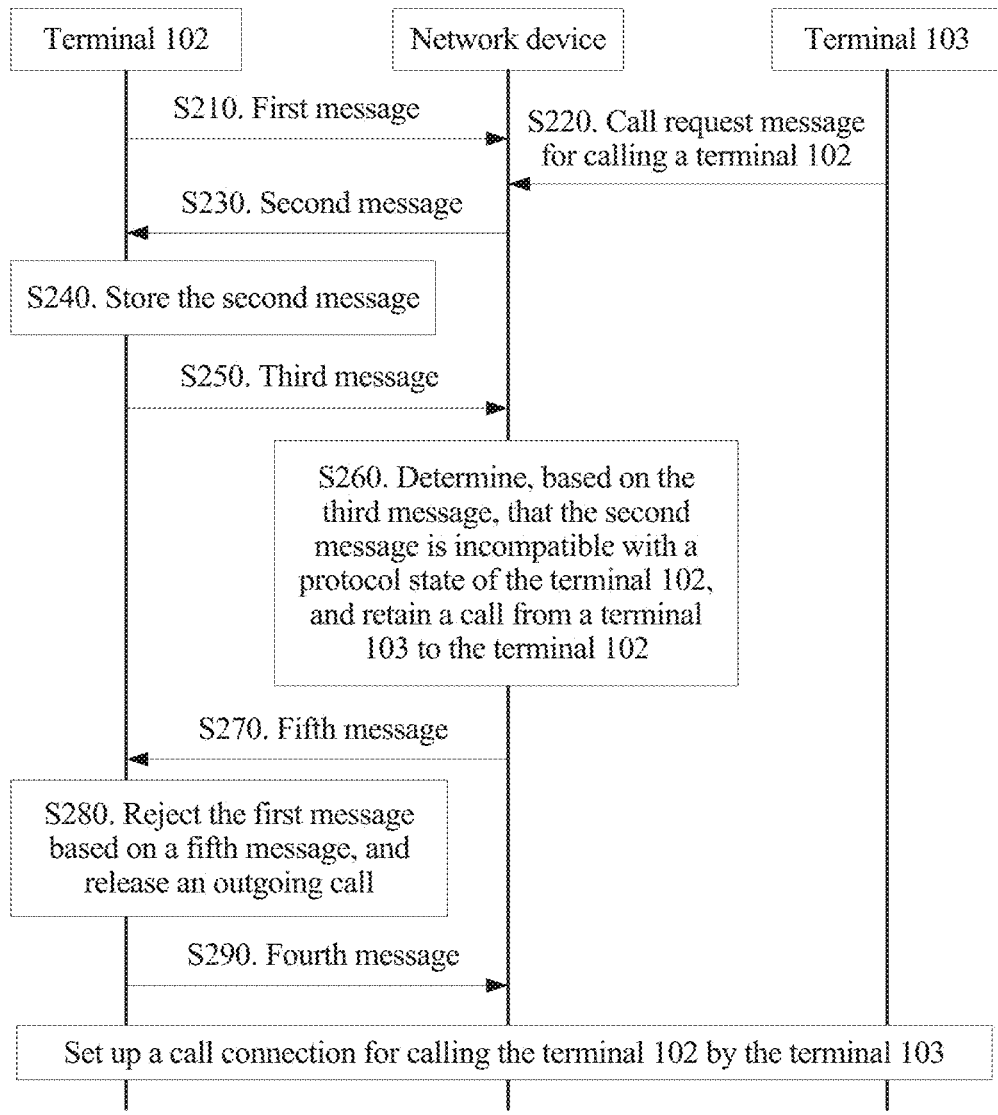
FIG. 2A is a schematic interaction diagram of a call setup method according to an embodiment of the present invention.

FIG. 2A is a schematic interaction diagram of a call setup method according to an embodiment of the present invention. As shown in FIG. 2A, the method specifically includes the following steps.

S210. A network device receives a first message sent by a terminal 102.

The first message is used by the terminal 102 to request to set up an outgoing call, and the terminal 102 enters a call initiating state. The outgoing call indicates that the terminal 102 requests to set up a call connection to another terminal such as a terminal 103. A call control status of the terminal 102 turns into a call initiating state. An initial state of the call control status may be a null (null) state or another state.

Specifically, when the terminal 102 needs to set up a communication connection to the terminal 103, the terminal 102 usually sends an outgoing call request message to the network device. A call object of the outgoing call request message is the terminal 103. The outgoing call request message may also be referred to as the first message. The terminal 102 enters an outgoing call initiating state.

Specifically, the first message sent by the terminal 102 to the network device may be a CM service request message (connect management, connect management layer; CM service request, connect management layer service request message). For example, for a request message "ID_NAS_CM_SERV_REQUEST", the request message carries an identifier of the terminal 103. The request message is used to request the network device to initiate a call to the terminal 103. NAS represents a non-access stratum (Non-Access Stratum), and SERV_REQUEST represents a call request message.

S220. The network device receives a call request message for calling the terminal 102 by a terminal 103.

A call request for calling the terminal 102 by the terminal 103 may be referred to as an incoming call request of the terminal 102.

When the terminal 102 calls the terminal 103, if the terminal 103 is not connected, the network device receives the call request message sent by the terminal 103 for calling the terminal 102. The foregoing case may occur due to a plurality of reasons. For example, a user of the terminal 102 and a user of the terminal 103 agree to contact with each other by phone at a specific time. In this case, the terminal 102 and the terminal 103 may send, at slightly different moments, respective call request messages for calling each other to the network device. Alternatively, when a call between the terminal 102 and the terminal 103 is abnormal and a connection is broken, but the call needs to be resumed, the terminal 102 and the terminal 103 may send, at slightly different times, respective call request messages for calling each other to the network device.

S230. The network device sends a second message to the terminal 102.

The second message is used by the terminal 102 to set up an incoming call. Setting up the incoming call means setting up a connection for an incoming call request.

For example, the network device sends the second message to the terminal 102 based on the call request message for calling the terminal 102 by the terminal 103. The second message may be a setup message (setup message). The foregoing step may be represented as ID_NAS_CC_SETUP. SETUP may represent a call indication message for calling the terminal 102 by the terminal 103, and CC may represent call control (Call Control).

S240. The terminal 102 determines, based on the received second message, that the second message is incompatible with a call initiating state of the terminal 102, and stores the second message.

In this case, the terminal 102 is in an outgoing call state. When receiving an incoming call, the terminal 102 determines that the outgoing call is incompatible with the incoming call, and then stores the second message. The incompatible state may include a plurality of cases, and may include but is not limited to the following three cases: The message is incompatible with and/or conflicts with a protocol state, a message type is incompatible with and/or conflicts with the protocol state, and the second message is incompatible with and/or conflicts with the first message. It may be specifically understood that a message type of the second message is incompatible with or conflicts with the call initiating state. A specific implementation solution may be understood as follows: After receiving an incoming call setup message, the terminal determines, based on a current state of the call initiating state, that the second message is incompatible with or conflicts with the current state of the terminal. In other words, after receiving the second message, the terminal in the call initiating state considers that the second message is a conflict message.

Optionally, when the terminal is in an MM connection pending (U0.1) state and waits to set up a mobility management (mobility management, MM) connection, the terminal may receive the second message, and determine that the outgoing call conflicts with the incoming call.

For example, if the terminal is UE, the process may be represented as UE NAS_CC. When receiving an incoming call message, the terminal 102 in the outgoing call state determines that an outgoing call message and the incoming call message are conflict messages, and caches a setup message.

S250. The terminal 102 sends a third message to the network device.

The terminal 102 sends the third message to the network device. The third message is used to indicate that the second message is incompatible with the protocol state of the terminal. The third message may be a status message (status message). The third message may carry a cause value.

For example, the terminal 102 sends a CC_STATUS message to the network device, to notify the network device that the second message is incompatible with the protocol state of the terminal. The status message may be represented as the third message, for example, ID_NAS_CC_STATUS. The status message may carry a cause value #98 "Message type not compatible with protocol state", or may carry a cause value #101 "Message not compatible with protocol state". The cause value is used to indicate that the type of the second message or the message itself is incompatible with the protocol state of the terminal.

S260. The network device determines, based on the third message, that the second message is incompatible with a protocol state of the terminal 102, and retains a call from the terminal 103 to the terminal 102.

Specifically, the network device determines, based on the third message, that the second message is incompatible with the protocol state of the terminal 102, and retains an incoming call state.

S270. The network device sends a fifth message to the terminal 102.

Specifically, the fifth message is used to reject the outgoing call setup. The fifth message may be represented as "CM service reject" (connect management, connect management layer; CM service reject, connect management layer service reject message).

For example, the foregoing step may be represented as ID_NAS_CM_SERV_REJECT, which indicates that the network device sends a service reject message to the terminal 102.

S280. The terminal 102 rejects the first message based on the received fifth message sent by the network device, and releases an outgoing call.

When the terminal 102 releases the outgoing call, an MM connection (mobility management, Mobility Management) that is already set up during the outgoing call is released in essence. Specifically, based on the fifth message sent by the network device, the terminal 102 releases a call control status in which the terminal 102 calls the terminal 103, and enters a call control status in which the terminal 103 calls the terminal 102. In this case, the terminal 102 switches the call control status from a call initiating state to an MNCC_SETUP_IND state. The MNCC_SETUP_IND state means mobile network call control setup adaptability (Mobile Network Call Control Set Up Indication).

For example, the terminal is UE. Based on the received fifth message sent by the network device, the UE releases an outgoing call control status, and turns off an outgoing call control status machine of the terminal. The UE turns on a new incoming call control status machine. The new incoming call control status machine starts with a null state, and ends with an MNCC_SETUP_IND state. Specifically, the terminal 102 may directly switch, or switch by using some intermediate states, the call control status from the call initiating state to the MNCC_SETUP_IND state. A specific implementation solution includes the following methods:

Method 1: There is a CC entity for each of the outgoing call and the incoming call. After the outgoing call is released, a call initiating state of an outgoing call CC state machine is switched into a null state. At this moment, an incoming call state machine is started, and a null state is switched into an MNCC_SETUP_IND state. Method 2: One CC entity is used for both the outgoing call and the incoming call. A call initiated (call initiated) state of the outgoing call is switched into an MNCC_SETUP_IND state of the incoming call. A specific conversion process may be: call initiated→null→MNCC_SETUP_IND, or may be directly performed. The conversion implementation solution includes but is not limited to the foregoing two methods.

S290. The terminal 102 sends a fourth message to the network device.

Specifically, the terminal 102 sends the fourth message to the network device. The fourth message is used by the terminal 102 to confirm the incoming call. The fourth message may be a call confirmed (call confirmed) message.

For example, the foregoing step may be represented as ID_NAS_CC_CALL_CONFIRM. The terminal 102 sends the call_confirm message to the network device. The call_confirm message may be represented as call confirmation information.

Finally, the network device sets up, based on the fourth message, a call connection for calling the terminal 102 by the terminal 103, in other words, sets up an incoming call connection.

Figure 2B:
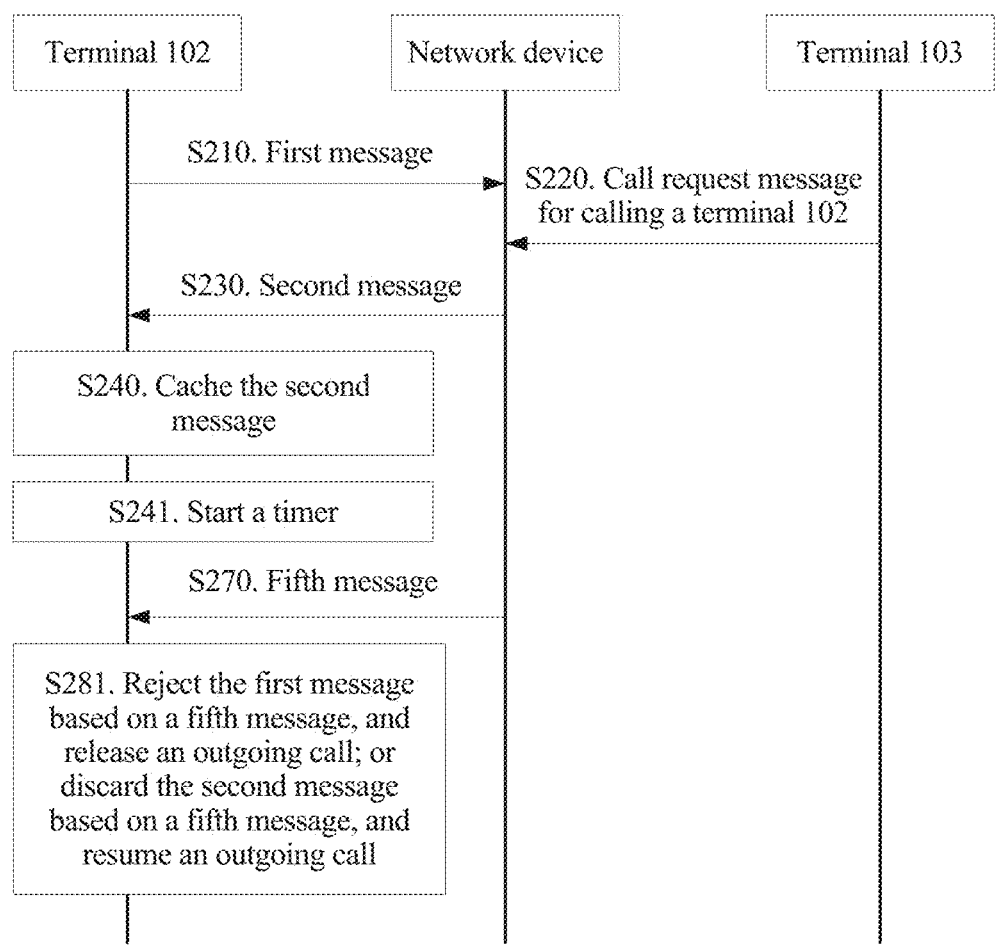
FIG. 2B is a schematic interaction diagram of another call setup method according to an embodiment of the present invention.

FIG. 2B is a schematic interaction diagram of another call setup method according to an embodiment of the present invention. Steps S210 to S240 of the call setup method shown in FIG. 2B is basically the same as S210 to S240 in the call setup method shown in FIG. 2A. Details are not described herein again.

In the call setup method shown in FIG. 2B, in S240, after receiving the second message, the terminal 102 does not process it as a protocol anomaly (incompatibility), but caches the second message. After caching the second message, the terminal 102 does not send a third message to the network device, but performs step S241. S241. The terminal 102 starts a timer.

Optionally, when the terminal is in an MM connection pending (U0.1) state and waits to set up a mobility management connection, the terminal may receive the second message. In this case, the terminal does not process it as a protocol anomaly. The terminal caches the second message, and waits for a message sent by a network for accepting or rejecting the outgoing call.

The timer started by the terminal 102 may be a cache timer. The cache timer is configured to cache the second message within a specific time period. When the cache timer expires, the terminal discards the cached second message.

As shown in FIG. 2B, although the terminal starts the timer after caching the second message, alternatively, the terminal may simultaneously cache the second message and start the timer. A time interval between caching the second message and starting the timer and a sequence of caching the second message and starting the timer do not constitute a limitation on this embodiment of the present invention.

After the terminal 102 starts the timer, if the timer does not expire, the terminal 102 waits for a fifth message sent by the network device, and separately performs the following different operations based on the fifth message sent by the network device.

In Case 1, the fifth message sent by the network device is used to reject outgoing call setup. The fifth message may be represented as "CM service reject" (connect management, connect management layer; CM service reject, connect management layer service reject message). For example, the foregoing step may be represented as ID_NAS_CM_SERV_REJECT, which indicates that the network device sends a service reject message to the terminal 102. Correspondingly, in step S281, the terminal 102 rejects the first message based on the fifth message sent by the network device, and releases the outgoing call.

After step S281, the terminal 102 may perform step S290 shown in FIG. 2A. To be specific, after releasing the outgoing call, the terminal may send a fourth message to the network device. The fourth message is used by the terminal to confirm the incoming call. After receiving the fourth message, the network device sets up a call connection for calling the terminal 102 by the terminal 103.

Optionally, before sending the fourth message to the network device, the terminal first determines whether there is a call indication message indicating that the terminal 102 is called. In other words, the terminal first reads the cached second message. After the terminal successfully reads the second message and processes the second message, the terminal sends the fourth message to the network device. The fourth message is used by the terminal 102 to confirm the incoming call. The fourth message may be a call confirmed (call confirmed) message. When the terminal fails to read the second message, for example, when the terminal has discarded the cached second message because the cache timer expires, the terminal does not send the fourth message to the network device.

In Case 2, the fifth message sent by the network device is used to accept outgoing call setup. The fifth message may be represented as "CM service accept" (connect management, connect management layer; CM service accept, connect management layer service accept message). For example, the foregoing step may be represented as ID_NAS_CM_SERV_ACCEPT, which indicates that the network device sends a service accept message to the terminal 102. Correspondingly, in step S281, the terminal 102 discards the cached second message based on the fifth message sent by the network device, and resumes the outgoing call setup. After step S281, the terminal 102 performs a step of setting up an outgoing call connection.

Figure 3:
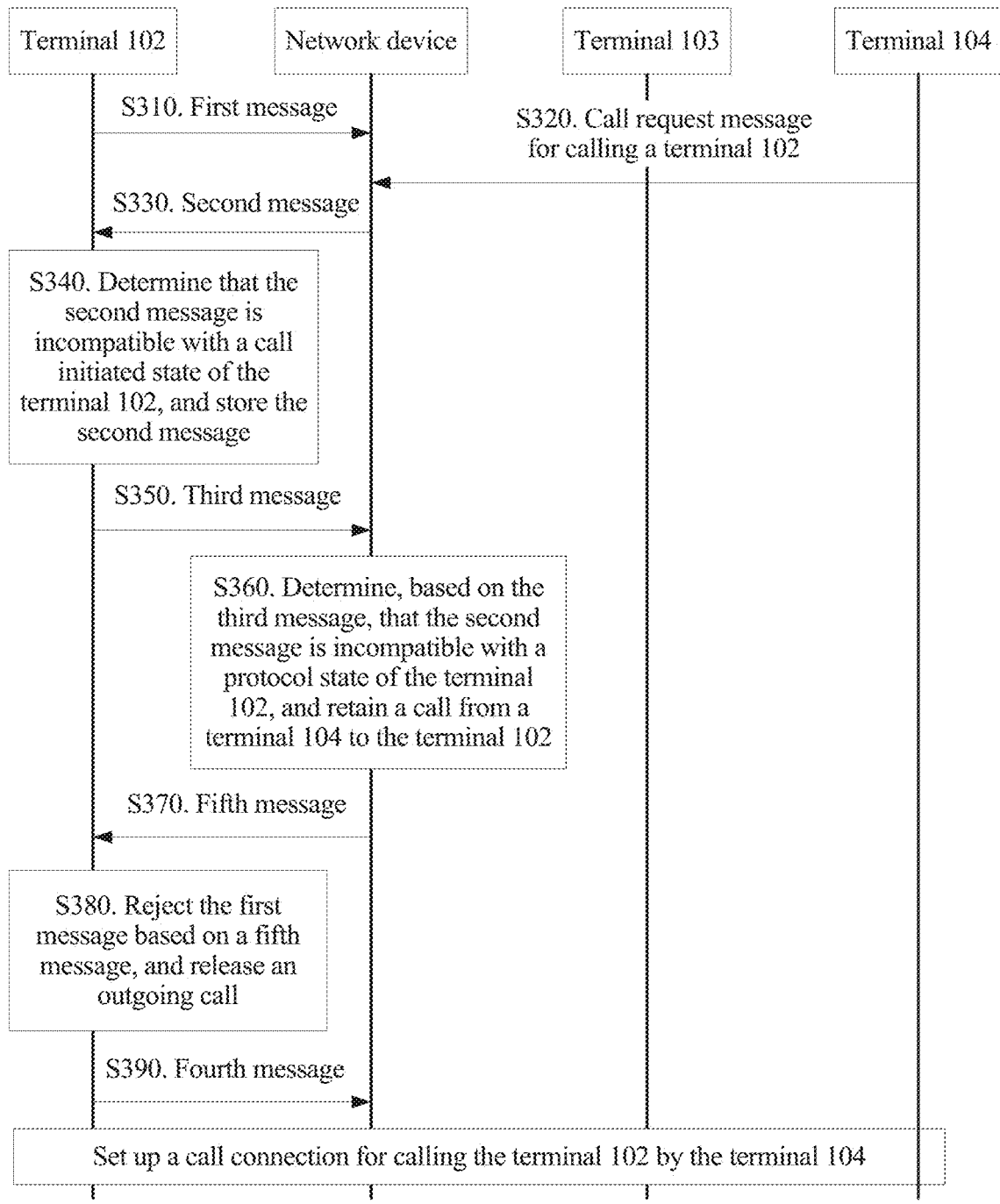
FIG. 3 is a schematic interaction diagram of still another call setup method according to an embodiment of the present invention.

FIG. 3 is a schematic interaction diagram of another call setup method according to an embodiment of the present invention. It should be noted that this method is applicable to a case in which a terminal 102 initiates an outgoing call to a terminal 103, the terminal 103 is not connected, and a terminal 104 initiates an outgoing call to the terminal 102. The call between the terminal 102 and the terminal 103 may be referred to as an outgoing call of the terminal 102. The call between the terminal 104 and the terminal 102 may be referred to as an incoming call of the terminal 102. Specifically, as shown in FIG. 3, the method specifically includes the following steps.

S310. A network device receives a first message sent by the terminal 102.

The first message is used by the terminal 102 to request to set up an outgoing call, and the terminal 102 enters a call initiating state. The outgoing call indicates that the terminal 102 requests to set up a call connection to another terminal. A call control status of the terminal 102 turns into a call initiating state. An initial state of the call control status may be a null (null) state or another state.

Specifically, when the terminal needs to set up a communication connection to the terminal 103, the terminal 102 usually sends an outgoing call request message to the network device. A call object of the outgoing call request message is the terminal 103. The outgoing call request message may also be referred to as the first message. The terminal 102 enters an outgoing call initiating state.

Specifically, the first message sent by the terminal 102 to the network device may be a CM service request message (connect management, connect management layer. CM service request, connect management layer service request message). For example, for a request message "ID_NAS_CM_SERV_REQUEST", the request message carries an identifier of the terminal 103. The request message is used to request the network device to initiate a call to the terminal 103. NAS represents a non-access stratum (Non-Access Stratum), and SERV_REQUEST represents a call request message.

S320. The network device receives a call request message for calling the terminal 102 by the terminal 104.

A call request for calling the terminal 102 by the terminal 104 may be referred to as an incoming call request of the terminal 102.

When the terminal 102 calls the terminal 103, if the terminal 103 is not connected, the network device receives the call request message sent by the terminal 104 for calling the terminal 102.

S330. The network device sends a second message to the terminal 102.

The second message is used by the terminal 102 to set up an incoming call. Setting up the incoming call means setting up a connection for an incoming call request.

For example, the network device sends the second message to the terminal 102 based on the call request message for calling the terminal 102. The second message may be a set up message (setup message). The foregoing step may be represented as ID_NAS_CC_SETUP. SETUP may represent a call indication message for calling the terminal 102, and CC may represent call control (Call Control).

S340. The terminal 102 determines, based on the received second message, that the second message is incompatible with a call initiating state of the terminal 102, and stores the second message.

In this case, the terminal 102 is in an outgoing call state. When receiving an incoming call, the terminal 102 determines that the outgoing call is incompatible with the incoming call, and then stores the second message. The incompatible state may include a plurality of cases, and may include but is not limited to the following three cases: The message is incompatible with and/or conflicts with a protocol state, a message type is incompatible with and/or conflicts with the protocol state, and the second message is incompatible with and/or conflicts with the first message. It may be specifically understood that a message type of the second message is incompatible with or conflicts with the call initiating state. A specific implementation solution may be understood as follows: After receiving an incoming call setup message, the terminal determines, based on a current state of the call initiating state, that the second message is incompatible with or conflicts with the current state of the terminal. In other words, after receiving the second message, the terminal in the call initiating state considers that the second message is a conflict message.

For example, if the terminal is UE, the process may be represented as UE NAS_CC. When receiving an incoming call message, the terminal 102 in the outgoing call state determines that an outgoing call message and the incoming call message are conflict messages, and caches a setup message.

S350. The terminal 102 sends a third message to the network device.

The terminal 102 sends the third message to the network device. The third message is used to indicate that the second message is incompatible with the protocol state of the terminal. The third message may be a status message (status message). The third message may carry a cause value.

For example, the terminal 102 sends a CC_STATUS message to the network device, to notify the network device that the second message is incompatible with the protocol state of the terminal. The status message may be represented as the third message, for example, ID_NAS_CC_STATUS. The status message may carry a cause value #98 "Message type not compatible with protocol state", or may carry a cause value #101 "Message not compatible with protocol state". The cause value is used to indicate that the message type of the second message or the message itself is incompatible with the protocol state of the terminal.

S360. The network device determines, based on the third message, that the second message is incompatible with a protocol state of the terminal 102, and retains a call from the terminal 104 to the terminal 102.

Specifically, the network device determines, based on the third message, that the second message is incompatible with the protocol state of the terminal 102, and retains an incoming call state.

S370. The network device sends a fifth message to the terminal 102.

Specifically, the fifth message is used to reject the outgoing call setup. The fifth message may be represented as "CM service reject" (connect management, connect management layer; CM service reject, connect management layer service reject message).

For example, the foregoing step may be represented as ID_NAS_CM_SERV_REJECT, which indicates that the network device sends a service reject message to the terminal 102.

S380. The terminal 102 rejects the first message based on the received fifth message sent by the network device, and releases an outgoing call.

When the terminal 102 releases the outgoing call, an MM connection (mobility management, Mobility Management) that is already set up during the outgoing call is released in essence. Specifically, based on the fifth message sent by the network device, the terminal 102 releases a call control status in which the terminal 102 calls the terminal 103, and enters a call control status in which the terminal 104 calls the terminal 102. In this case, the terminal 102 switches the call control status from the call initiating state to an MNCC_SETUP_IND state. The MNCC_SETUP_IND state means mobile network call control setup adaptability (Mobile Network Call Control Set Up Indication).

For example, the terminal is UE. Based on the received fifth message sent by the network device, the UE releases an outgoing call control status, and turns off an outgoing call control status machine of the terminal. The UE turns on a new incoming call control status machine. The new incoming call control status machine starts with a null state, and ends with an MNCC_SETUP_IND state. Specifically, the terminal 102 may directly switch, or switch by using some intermediate states, the call control status from the call initiating state to the MNCC_SETUP_IND state. A specific implementation solution includes the following methods: Method 1: There is a CC entity for each of the outgoing call and the incoming call. After the outgoing call is released, a call initiating state of an outgoing call CC state machine is switched into a null state. At this moment, an incoming call state machine is started, and a null state is switched into an MNCC_SETUP_IND state. Method 2: One CC entity is used for both the outgoing call and the incoming call. A call initiating state of the outgoing call is switched into an MNCC_SETUP_IND state of the incoming call. A specific conversion process may be: call initiated→null→MNCC_SETUP_IND, or may be directly performed. The conversion implementation solution includes but is not limited to the foregoing two methods.

S390. The terminal 102 sends a fourth message to the network device.

Specifically, the terminal 102 sends the fourth message to the network device. The fourth message is used by the terminal 102 to confirm the incoming call. The fourth message may be a call confirmed (call confirmed) message.

For example, the foregoing step may be represented as ID_NAS_CC_CALL_CONFIRM. The terminal 102 sends the call_confirm message to the network device. The call_confirm message may be represented as call confirmation information.

Finally, the network device sets up, based on the fourth message, a call connection for calling the terminal 102 by the terminal 104, in other words, sets up an incoming call connection.

Optionally, corresponding to the call setup method shown in FIG. 2B, in the call setup method shown in FIG. 3, after step S340, step S350 may not be performed. In other words, the terminal 102 does not send the third message to the network device, but caches the second message, and waits to receive the fifth message sent by the network device. Operations performed after the second message is cached is the same as those in the call setup method shown in FIG. 2B. For details, refer to the foregoing descriptions. Details are not described herein again.

Figure 4:
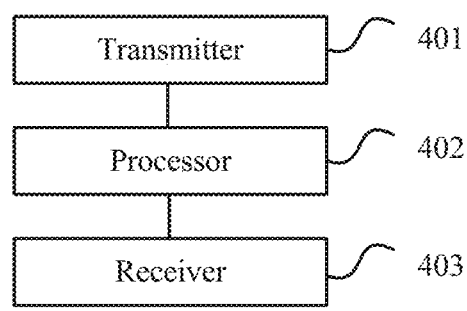
FIG. 4 is a schematic structural diagram of a terminal according to an embodiment of the present invention.

FIG. 4 is a schematic structural diagram of a terminal according to an embodiment of the present invention. The terminal includes a transmitter 401, a processor 402, and a receiver 403.

A transceiver may include the receiver 403 and the transmitter 401, and the receiver and the transmitter may be integrated. The transmitter adjusts (for example, through analog conversion, filtering, amplification, or up-conversion) an output sample and generates an uplink signal. The uplink signal is transmitted to a network device by using an antenna. In a downlink, an antenna receives a downlink signal transmitted by the network device in the foregoing embodiments. The receiver adjusts (for example, through filtering, amplification, down-conversion, or digitization) a signal received from the antenna and provides an input sample. The terminal may further include a modem processor. The modem processor receives service data and a signaling message that are to be sent in the uplink, and processes (for example, formats, encodes, or interleaves) the service data and the signaling message. The modem processor further processes (for example, symbol-maps or modulates) encoded service data and an encoded signaling message, and provides an output sample. The modem processor processes (for example, demodulates) the input sample and provides symbol estimation; and processes (for example, de-interleaves or decodes) the symbol estimation and provides decoded data and a decoded signaling message to be sent to UE. The units perform processing based on a radio access technology (for example, access technologies of LTE and another evolved system) used in a radio access network.

The processor controls and manages an action of the terminal, and is configured to perform processing performed by the terminal in the foregoing embodiments. For example, the processor is configured to control a call setup of the terminal and/or another process of a technology described in the present invention. An example is used for description below.

The transmitter 401 is configured to send a first message to a network device, where the first message is used by the terminal to request to set up an outgoing call.

The processor 402 is configured to control the terminal to enter a call initiating state.

The receiver 403 is configured to receive a second message sent by the network device, where the second message is used by the terminal to set up an incoming call.

The transmitter 401 is further configured to send a third message to the network device, where the third message is used to indicate that the second message is incompatible with a protocol state of the terminal.

In an optional implementation, the transmitter 403 is further configured to send a fourth message to the network device, where the fourth message is used by the terminal to confirm the incoming call.

In an optional implementation, the processor 402 is further configured to determine that the second message is incompatible with the call initiating state.

In an optional implementation, the processor 402 is further configured to cache the second message.

The receiver 403 is further configured to receive a fifth message sent by the network device, where the fifth message is used to reject or accept the outgoing call setup.

In an optional implementation, the processor 402 is further configured to release the outgoing call based on the fifth message.

In an optional implementation, the processor 402 is further configured to switch a call control status from the call initiating state to an MNCC_SETUP_IND state.

In an optional implementation, the processor 402 is further configured to start a cache timer, and release or resume the outgoing call based on the fifth message.

In an optional implementation, the processor 402 is further configured to read the cached second message.

In an optional implementation, the processor 402 is further configured to discard the cached second message when the fifth message is used to accept the outgoing call setup.

In addition, the terminal may further include the memory, configured to store program code and data of the terminal.

Figure 5:
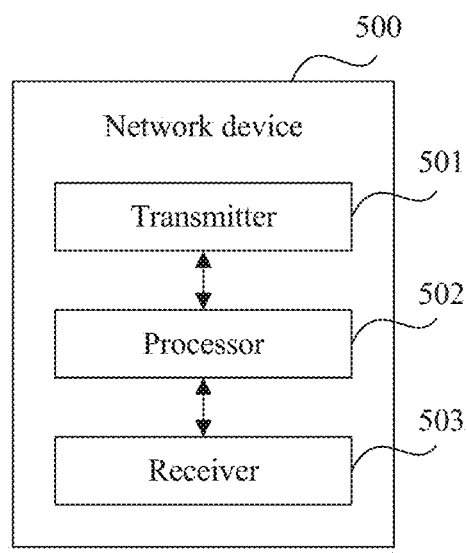
FIG. 5 is a schematic structural diagram of a network device according to an embodiment of the present invention.

FIG. 5 is a schematic structural diagram of a network device according to an embodiment of the present invention. The network device 500 includes a transmitter 501, a processor 502, and a receiver 503. The processor is configured to control and manage an action of the network device, and execute various functions to support communication services of a terminal.

Specifically, the transmitter 501 is configured to send a first message to the network device, where the first message is used to request to set up an outgoing call. The transmitter 501 is further configured to send a second message to the terminal, where the second message is used by the terminal to set up an incoming call.

The receiver 503 is configured to receive a third message sent by the terminal, where the network device determines, based on the third message, that the second message is incompatible with a protocol state of the terminal. The receiver is further configured to receive a fourth message sent by the terminal.

The processor 502 is configured to set up the incoming call connection to the terminal.

For example, the processor is configured to support the network device in performing the process 402 in FIG. 4 and/or another process of the technology described in this specification. The network device further includes a memory, configured to store program code and data of the network device. A transceiver 503 is configured to support communication with another network entity. The transceiver may include the receiver and the transmitter. The receiver and the transmitter may be integrated.

The processor configured to perform functions of the terminal or the network device in the embodiments of the present invention may be a central processing unit (Central Processing Unit, CPU), a general purpose processor, a digital signal processor (Digital Signal Processor. DSP), an application-specific integrated circuit (Application-Specific Integrated Circuit, ASIC), a field-programmable gate array (Field-Programmable Gate Array, FPGA) or another programmable logic device, a transistor logic device, a hardware assembly, or any combination thereof. It may implement or execute various example logical blocks, modules, and circuits that are described with reference to the contents disclosed in the present invention. The processor may also be a combination of computing functions, for example, a combination of one or more microprocessors or a combination of a DSP and a microprocessor. The transceiver may be a communications interface, a transceiver circuit, or the like. The transceiver is a generic term, and may include one or more interfaces.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk, (SSD)), or the like.

The foregoing descriptions are merely examples of embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An electronic terminal device comprising:
a memory; and
a processor coupled to the memory and configured to execute the instructions, which cause the electronic terminal device to:
send a request message to a network device, wherein the request message requests an outgoing call setup;
receive an initiation message from the network device to set up an incoming call;
cache the initiation message;
receive a rejection message from the network device, wherein the rejection message is configured to either prompt rejection of the outgoing call setup or prompt acceptance of the outgoing call setup;
discard the initiation message and release the outgoing call when the rejection message is configured to prompt rejection of the outgoing call setup;
resume the outgoing call setup when the rejection message is configured to prompt acceptance of the outgoing call setup;
prepare a confirmation message to the network device configured to prompt confirmation of the incoming call; and
send the confirmation message to the network device to confirm the incoming call.

2. The electronic terminal device of claim 1, wherein the instructions further cause the electronic terminal device to:
start a timer; and
discard the initiation message in response to the timer expiring.

3. The electronic terminal device of claim 1, wherein the instructions further cause the electronic terminal device to read the initiation message.

4. The electronic terminal device of claim 1, wherein the request message comprises a connect management service request message.

5. The electronic terminal device of claim 1, wherein the instructions further cause the electronic terminal device to determine that the initiation message is incompatible with the call initiating state.

6. The electronic terminal device of claim 1, wherein the instructions further cause the electronic terminal device to send a status message to the network device indicating that the initiation message is incompatible with the call initiating state.

7. The electronic terminal device of claim 1, wherein the rejection message comprises a connect management service accept message.

8. A non-transitory computer-readable medium having computer usable instructions stored therein for execution by a processor housed in an electronic terminal device, wherein the instructions cause the processor to:
send a request message to a network device, wherein the request message requests an outgoing call setup;
receive an initiation message from the network device to set up an incoming call;
cache the initiation message;
receive a rejection message from the network device, wherein the rejection message is configured to either reject the outgoing call setup or accept the outgoing call setup;
discard the initiation message and release the outgoing call when the rejection message is configured to prompt rejection of the outgoing call setup;
resume the outgoing call setup when the rejection message is configured to prompt acceptance of the outgoing call setup; and
send a confirmation message to the network device configured to confirm the incoming call.

9. The non-transitory computer-readable medium of claim 8, wherein the instructions further cause the processor to:
start a timer; and
discard the initiation message in response to the timer expiring.

10. The non-transitory computer-readable medium of claim 8, wherein the instructions further cause the processor to read the second message.

11. The non-transitory computer-readable medium of claim 8, wherein the request message comprises a connect management service request message.

12. The non-transitory computer-readable medium of claim 8, wherein the instructions further cause the processor to determine that the initiation message is incompatible with the call initiating state.

13. The non-transitory computer-readable medium of claim 8, wherein the instructions further cause the processor to send a status message to the network device indicating that the initiation message is incompatible with the call initiating state.

14. The non-transitory computer-readable medium of claim 8, wherein the rejection message is a connect management service accept message.

15. A call set up method, implemented by a terminal, comprising:
sending a request message to a network device requesting outgoing call setup;
receiving an initiation message from the network device to set up an incoming call;
caching the initiation message;
preparing a confirmation message to the network device suitable to confirm the incoming call;
receiving a rejection message from the network device, wherein the rejection message is configured to either reject the outgoing call setup or accept the outgoing call setup;
discarding the initiation message in response to the rejection message accepting the outgoing call setup;
resuming the outgoing call setup in response to the rejection message accepting the outgoing call setup;
releasing the outgoing call in response to the rejection message selects to reject the outgoing call setup; and
sending the confirmation message to the network device to confirm the incoming call.

16. The call set up method of claim 15, wherein the method further comprises:
starting a timer; and
discarding the initiation message in response to the timer expiring.

17. The call set up method of claim 15, wherein the method further comprises reading the initiation message.

18. The call set up method of claim 15, wherein the request message comprises a connect management service request message.

19. The call set up method of claim 15, wherein the method further comprises determining that the second message is incompatible with the call initiating state.

20. The call set up method of claim 15, wherein the method further comprises sending a status message to the network device indicating that the second message is incompatible with the call initiating state.

* * * * *

UNITED STATES PATENT AND TRADEMARK OFFICE
CERTIFICATE OF CORRECTION

Page 1 of 1

PATENT NO. : 10,959,278 B2
APPLICATION NO. : 16/487253
DATED : March 23, 2021
INVENTOR(S) : Kai Yuan et al.

It is certified that error appears in the above-identified patent and that said Letters Patent is hereby corrected as shown below:

On the Title Page

Item (72) Inventors: "Fenghui Duo Beijinig (CN)" should read "Fenghui Duo Beijing (CN)"

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*